J. Robertson.
Dredging Machine.
N° 80,226. Patented Jul. 21, 1868.

Witnesses
Inventor
James Robertson.

J. Robertson.
Dredging Machine.

N°80,225.  Patented Jul. 21, 1868.

Witnesses

Inventor
James Robertson

United States Patent Office.

JAMES ROBERTSON, OF GLASGOW, SCOTLAND.

Letters Patent No. 80,225, dated July 21, 1868.

IMPROVED EXCAVATING-MACHINE.

The Schedule referred to in these Letters Patent and making part of the same.

TO ALL WHOM IT MAY CONCERN:

Be it known that I, JAMES ROBERTSON, of Glasgow, in that part of her Britannic Majesty's dominions called Scotland, engineer, have invented certain new and useful "Improvements in Excavating, Dredging, Raising, and Transmitting Earthy and other Loose Matter;" and I do hereby declare that the following is a full description thereof, reference being had to the accompanying six sheets of drawings, forming a part of this specification, and to the numerals and letters thereon; that is to say—

My invention relates to new and improved combinations and arrangements of apparatus or mechanism to be employed in excavating, dredging, raising, and transmitting earthy and other loose matter, that is to say, for moving it from one position to another, when currents of water, currents of steam, or currents of steam and air combined, are forced or caused to pass through the said apparatus, preferably at high speeds, and are the agents in, through, or by which the lifting or moving of the said matter is effected, and consists essentially of combinations of conduits and mouth-pieces, and arrangements or combinations of these with other mechanism and structures for various useful purposes, as hereinafter is mentioned. These conduits and mouth-pieces serve, the former to conduct and direct the flow of the fluid-currents, and the latter to enter amongst or against and receive the matter to be lifted or moved, and allow it to be carried away, held in mechanical suspension or otherwise, in the fluid-currents in large quantities.

Where water is used as the lifting or moving medium or agent, forced currents are employed, or currents in motion by force transmitted to them before they reach the mouth-piece or opening where the matter to be lifted or moved enters, or both forcing and exhausting action are employed to give speed to the current. When steam or steam and air combined are employed as the lifting or moving medium or agent, forced currents are used as well as simple exhausting action only, or these are employed in combination. I also employ, in some cases, endless or returning currents, and use the water or steam, or steam and air combined, or a portion of it or them, over again, after having removed therefrom the matter lifted or moved, for the purpose of economizing these fluids.

The matter to be lifted or moved through the mouth-pieces hereinbefore mentioned is acted upon by a forced descending and ascending current of water or steam, or steam and air combined, on each side of such mouth-pieces, or by a forced descending current on one side, and by a drawn or exhaust current on the other side thereof; but it is not proposed or intended to use or employ mouth-pieces with drawn or exhaust currents, except, as hereinafter will appear, in a few instances, in the application of steam, or steam and air combined, and then I use exhaust currents induced by steam only.

I may here premise that the currents of water to be used for acting upon and lifting or moving the earthy or other materials or particles of matter may be produced or obtained by using almost any of the forcing and lifting-pumps and machines or apparatus at present in use for the raising of water, or for the producing of currents of fluids generally. I, however, prefer those mechanical arrangements which give constant currents on the injection or eduction principle, (as hereinafter will be set forth in describing the several modifications shown on the drawings,) such as centrifugal pumps, the gravitation of collected water at a higher level than that to which the currents have to lift or move the matter, or by small jets or streams of high-pressure steam, giving motion to water on the principle of the instrument known as "Giffard's injector." The steam to be used is raised in boilers to a high pressure, and is emitted through jets at a high velocity. It is generally preferable to use steam and air combined, and to give motion to the air by a jet or jets of high-pressure steam, so as thereby to form the combined fluid, which, I may here state, does not condense so readily as steam by itself.

And in order that my said invention, and the best manner of performing the same with which I am acquainted, may be properly understood by others, I will now proceed to describe the several illustrative figures on the six sheets of drawings appended hereto, premising that like letters and numerals indicate the same or corresponding parts on all the figures, wherever such parts are shown.

Figures 1 to 29 inclusive, on sheet 1, are drawings or views shown detached to large scales or sizes of various forms of "mouth-pieces," and parts of conduits constructed for acting upon and raising or conveying various matters and substances by currents of water, in accordance with and for the purposes included under this part of my said invention.

Figures 1, 2, 3, 6, 20, 21, 22, 25, 26:
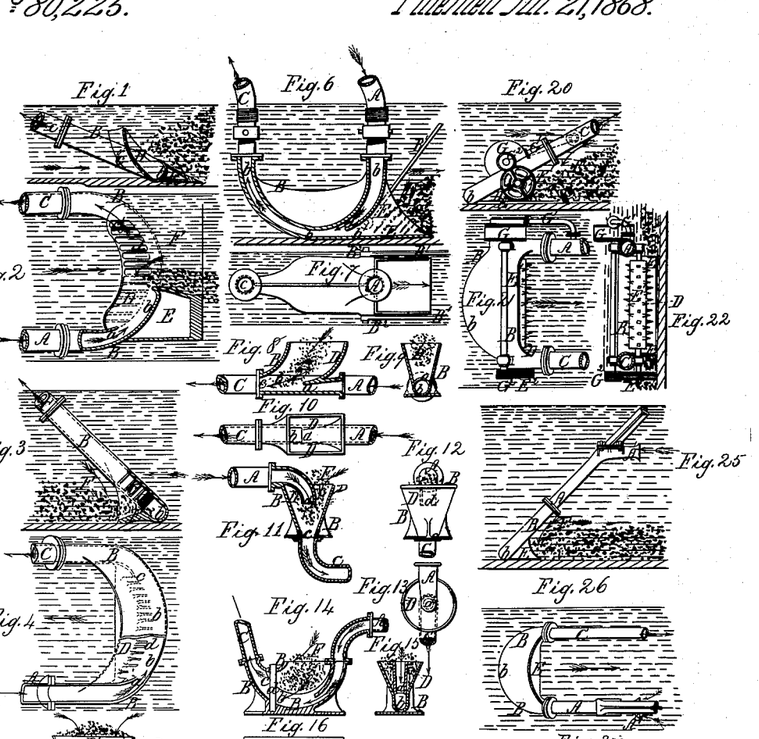
Figure 1 is a sectional elevation.
Figure 2 is a sectional plan of one form of mouth-piece, adapted for excavating and raising materials, such as sand and shingle, from a sloping embankment, such as is usually presented at the part being cut in forming or excavating a wide channel or canal.
Figure 3 is a sectional elevation.
Figure 6 is a sectional side elevation.
Figure 20 is a side elevation.
Figure 21 is a plan.
Figure 22 an end elevation of a mouth-piece for acting under water on a clay or shale bottom, and for materials too hard or solidified for the action of the wedge-shaped grubber E, hereinbefore described, or of that of the water alone to disintegrate.
Figure 25 is a side elevation.
Figure 26 is a plan of a mouth-piece, B, adapted for acting under water of the same form and construction as that shown and described in connection with figs. 3, 4, and 5, but in this modification the forcing-pipe A draws its supply of water from the surrounding water by gravitation, which enters in by the bell-mouth or opening $A^1$, and passes down and round the channel $b$ of the mouth-piece, and is exhausted by the pipe C. In this way the forcing-jet is obtained from the surrounding water, and, though less effective than where greater power can be had, will, joined with the effect of the grubber E and mouth-piece B, be sufficient to lift light materials, such as mud, by or in combination with exhaust currents of water drawn up through the pipe C.
Figures 27, 29:
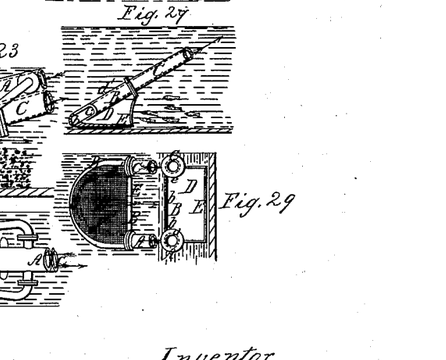
Figure 27 is a sectional elevation.
Figure 29 is an end elevation of a mouth-piece adapted for lifting bodies floating in the water, shell-fish, or other valuable materials.

In this arrangement, it is preferred to conduct the current of water down the induction-pipe A to the mouth-piece B, and up from it through the eduction or discharge-pipe C, at a very considerable elevational angle, as seen in fig. 1. The conduit of the mouth-piece B is made of a semicircular or segmental form, in plan, (fig. 2,) the two ends of the segment being bolted by flanges to the induction and eduction-pipes A and C respectively, and for a considerable portion, near the centre of the segment, the conduit is made in the form of a semicircular or U-shaped channel, in cross or elevational section, (fig. 1,) opening on the inner side of the arc, at $b$, into a concentric, large crescent-formed mouth or opening, D, on the upper side, (fig. 2,) formed or furnished with a grating, $d$, to prevent an object entering the open mouth D or channel $b$ which would not pass out with the current of water up the discharge-pipe C.

A broad wedge-shaped projection, E, which is cast upon the lowest part of the mouth-piece B, is forced forward, in the direction of the red arrows, into the sand or other material, F, of the excavation or cutting to be raised, so as to loosen it and cause it to fall through the grating $d$ into the segment U-shaped open channel $b$, where the strong current of injected water issuing from the slightly-contracted nozzle $a$ of the continuation of the induction-pipe A, in sweeping round the channel $b$, acts upon and carries the materials F round with the current which enters the wide bell-mouth $c$ of the end of the eduction or discharge-pipe C, up and through which both the current and suspended matters are forced and discharged, as will be hereinafter more fully described in showing particular adaptations of the several mouth-pieces, as applied to the complete machines or apparatus for carrying out this part of my said invention in practice.

The forward motion of the mouth-piece B is regulated so as to deliver a proper quantity of the material F into the channel $b$, proportionally to the strength and velocity of the current of water passing around it, twelve feet per second being usually sufficient to carry off sand, mud, or gravel with this apparatus.

The nozzle at $a$ is contracted somewhat smaller than the size of the forcing-pipe A, so as to give greater impact to the material to be raised, made to intervene between it and the exhaust or eduction-opening $c$, and the segmental form of the channel $b$ causes the current of water to keep or pass round the channel with considerable force, due somewhat proportionally to the velocity of the current and the curve of the segmental channel, through which it is made to descend or pass.

The tendency to induct the materials F into the opening D of the mouth-piece B, herein described, though more or less efficient with many descriptions of materials required to be raised, will, nevertheless, be only of small advantage, unless with close-ground or plastic substances, such as mud or fine sand. In acting on a sloping embankment, as herein shown at F, figs. 1 and 2, the operation of entering the materials F into the mouth D may, with advantage, be assisted by hand-labor, with a spade, this form of mouth-piece A being adapted to work in the open air or under water, as may be required.

Figure 4 is a sectional plan of a somewhat similar mouth-piece to that shown and described in connection with figs. 1 and 2, the water-channel $b$ being also semicircular, both in vertical section and plan, figs. 3 and 4, and the inlet and outlet-orifices $a$ and $c$ are also similarly formed and disposed in the mouth-piece A.

The current of the water entering by the pipe A passes through the jet-orifice $a$, round the open channel $b$, and off through the exhaust-pipe C. The wedge-shaped grubber is, however, in this modification, (figs. 3, 4, and 5,) turned inwards, or formed on the concave side of the mouth-piece B, which is moved forward and made to act on the materials to be raised somewhat similarly to the motion of a rake, in the direction of the red arrows, and, as the mouth-piece is so drawn or pushed, the materials F pass over the wedge-shaped rubbing-piece E, and fall through the grating $d$ into the channel $b$, and are carried round and off through the discharge-pipe C.

The rake-shaped form of this mouth-piece B makes it particularly suitable for dredging and cutting purposes in a variety of ways. The semicircular form of the channel $b$ causes the water, when being forced through or round it at a high speed, to keep within the channel, and pass out at the orifice $c$ of the pipe C without escaping at the grating D.

Figure 7 is a plan of a mouth-piece, B, adapted to be used in confined positions, and for raising lighter materials than either of the mouth-pieces hereinbefore described.

The water-channel $b$ in this modification is circular in plan, fig. 7, at the ends, where the mouth-piece is coupled to the inlet and outlet-pipes A and C respectively, but contracted gradually in a segmental direction (fig. 6) to a broad-tapered or shallow orifice or jet-opening, at $a$, and continues this shape round past the lowest point, when it gradually contracts into circular form, where it joins the outlet-pipe C.

The lowest part of this mouth-piece B is formed with a flat-soled scoop or spade-shaped projection, E, for entering and receiving the mud or other substance, F, to be raised, which substance, as it comes forward, enters the broad shallow tangential orifice $b^1$, below the induction-jet opening $a$, the stream of water from which, by its force, causes a partial vacuum at the orifice $b^1$, and draws in the substance F, which is then acted upon and carried up the channel $b$ along with the current of water, and discharged through the outlet-pipe C.

The direction of the forward motion of the mouth-piece B is indicated by the red arrows. This motion is effected by the two side draw-bars or rods B¹, secured and made to oscillate on the studs B², which are keyed in bosses cast on the sides of the mouth-piece. The pipes A and C are made of flexible hose, and secured by screw-couplings and flange-joints to the mouth-piece, and they are made flexible, to enable this arrangement of mouth-piece to be used in more confined and inaccessible places than either of the former modifications described, and though it may be used in dry places in the open air, it is more particularly adapted for being worked in water and watery places.

Figure 8 is a longitudinal vertical section,

Figure 9 a transverse vertical section, and

Figure 10 a plan of a mouth-piece, which can with advantage be used where the materials to be raised or conveyed can be filled into it by hand-labor, with a spade or otherwise, at the top of the mouth-piece B. The channel $b$, through which the current of water is made to flow, is straight in this modification, but is contracted slightly at the jet-opening $a$, (fig. 8,) and flanged at the ends to which the forcing or inlet-pipe, A, and exhaust or outlet-pipe, C, is attached. The direction of the current of water through the pipes A and C and channel $b$ is indicated by the black arrows in the several figures, as well as that of the entrance of the materials F to be raised or conveyed, which in this mouth-piece are fed in at the top of the hopper-shaped orifice or receiver D, cast on the top of the U-shaped straight water-channel $b$, opening into it (fig. 9) immediately before the jet-opening $a$, so that the materials F fall or enter the current of water, and are conveyed forward along with it through the discharge-pipe C.

Figure 11 is a sectional side elevation,

Figure 12 an end elevation, and

Figure 13 a plan of another modification of hopper mouth-piece, also adapted to have the materials F to be lifted or transmitted to be filled in at the open top, which may be done by hand-labor, and the spade or otherwise, at the conically-shaped hopper D, which has formed on it, at the top, a curved jet-pipe, $a$, projecting downwards in the direction and concentric over the exhaust or outlet-orifice $c$ of the outlet bent pipe C. The current of water forced through the inlet-pipe A passes through the injection-pipe or orifice $a$, and down through the conical hopper D, and acts on the materials F which had been previously filled in, and which, by their gravitation and the suction of the jet of water, so as to carry them along with it out at the eduction-orifice $c$ of the discharge-pipe C, all in the direction of the black-lined arrows in the figures.

Figure 14 is a sectional side elevation,

Figure 15 a sectional end elevation, and

Figure 16 a plan of another hopper-shaped mouth-piece, well adapted for discharging ballast from ships, and for similar purposes.

The water-channel $b$ in this modification is of a segmental form in side elevation, (fig. 14,) and also of the U-shape in transverse section, (fig. 15,) and having a flat sole or box-plate, suitable for fastening it down to the floor. A wide hopper-shaped opening, D, is formed over the channel $b$, into which the material to be raised is thrown, as indicated at F, and which, as it descends into the current of water issuing from the segmental and contracted injection-orifice $a$, is carried round the segmental U-shaped channel $b$, out at the wide open exit-orifice $c$ along with the current, up through the discharge-pipe C, the direction of the current of water and the insertion of the material F to be raised being indicated by arrows in the figures; and to prevent too large an object passing into the orifice $c$ of the exhaust-pipe, it is fitted with a central grate-bar, $d$, by preference of a wedge-shape, which would tend to divide soft subjects passing in by the force of the current.

Figure 17 is a side elevation, and

Figure 18 is a sectional plan of a mouth-piece, B, formed to give an eddying motion to the current of water, so as to have a disintegrating effect upon the materials while acting on them in the mouth-piece, so as to raise or convey them to a distance, as required.

The channels $b$ in this modification are semicircular or of a U-shape in vertical cross-section, and of a descending, spiral, or helical form from the top inlet-pipe A to the bottom outlet-pipe C, and twisting all round the outer circumference of the open receptacle D, surmounted by a conical hopper, D¹, for the reception of the materials, the whole by preference being cast in one piece, with a sole or base-plate closing in the lower end of the chamber D. The forced current of water entering from the inlet-pipe A passes in at the orifice $a$, and spirally down, through, or round the open channel $b$, and out at the exhaust-orifice $c$, off through the outlet-pipe C, and, as the materials, indicated at F, are thrown or fed in at the top of the chamber D, they are carried round and down the vessel D with considerable centrifugal force, which increased motion of the particles disintegrates them and allows them to pass off freely, along with the current of water, by the orifice $c$ and pipe C, and this mouth-piece is more particularly adapted for working in the open air.

Figure 19 is a side elevation of another modification of spiral mouth-piece B, constructed much in the same manner as that described in reference to figs. 17 and 18, and is more particularly adapted for working in watery places, and for the raising and transmitting of such matter as sand and mud.

The receptacle D, for receiving the material indicated at F to be raised, is in this case closed in by a cover on the top side, and is formed with an open mouth at the under side, which is drawn, with this mouth-piece B, over the substance to be carried off by the exhaust-pipe C, by preference, lying in an angular direction, as shown in the drawing. The current of water enters at the top pipe A, which, by its centrifugal or eddying action, caused by descending the open U-shaped spiral channel $b$, and by the motion of drawing the lower open mouth D close to and over the substance (as at F) to be raised, causes them to be drawn into the chamber D, and to be forced, carried up, and discharged, along with the water, out through the orifice $c$ and the outlet-pipe C.

The form of the mouth-piece itself in this modification is the same as that described in reference to figs. 3, 4, and 5, having a segmental water-channel, $b$, and the water entering by the pipe A and exhausting by the pipe C, all in the same manner. The opening D into the mouth-piece B, for receiving the materials to be raised or transmitted, has placed in it a revolving cylinder, $E^1$, having strong pikes fixed in it, as shown, which, as the cylinder revolves, act upon the materials F required to be raised as the mouth-piece B is traversed forward in the direction of the red arrows, so as to throw the materials F upon the top of the wedge-shaped grubber E, through the opening D and grating $d$ into the water-chamber $b$. Motion is given to the spiked cylinder $E^1$ by a turbine, placed in the box G, driven by a stream of water conveyed to it in the small pipe $G^1$ from the lower part of the injection-pipe A of the mouth-piece B; has a grooved frictional pinion, $G^2$, keyed on its other free end, geared into a large corresponding friction-wheel, $E^2$, keyed on the spindle of the cylinder $E^1$, so as to actuate it.

Figure 23 is a sectional side elevation, and

Figure 24 is a plan of a mouth-piece, B, adapted for acting under the water, the channel $b$ of which is cylindrical where it is jointed to the forcing-pipe A, and gradually assumes an oblong or broad flattened form in plan, fig. 23, and a narrow scroll or curved form in fig. 24 as it approaches to the jet-opening $a$, where it is contracted in order to give the full force of the jet or current, and bent round, so that the jet plays across the opening or mouth D, where the materials F required to be raised are made to enter the exhaust-opening $c$, while the motion of the mouth-piece B is being traversed close to and over the materials F to be raised, in the direction of the red arrows, so that they may get mixed and suspended in the current of water, and are carried forward through the exhaust-aperture $c$ and up through the discharge-pipe C.

Two jet-pipes, $d^1$ and $d^1$, are connected to the forcing-side mouth-piece, directing the jets down into the sand or clay, to loosen it, where it may be in a too solid state for being acted on by the mouth-piece alone, and which, for some descriptions of materials, would loosen it sufficiently by the impact of the jets.

Figure 28 is a plan, and

The form and construction of the mouth-piece are very much similar to that described in connection with figs. 3, 4, and 5, but is provided with a netting or grating of wire gauze, $d^1$, stretched across the top of the mouth-piece or casting, close to the upper side of the channel, so as to lead or guide the floating matters very direct into the water-channel $b$, and the grubber or skimmer E is made rather longer than that shown in figs. 3, 4, and 5, so as to have a greater guiding and retaining effect on the ground and the materials entering the opening D. Arranged in this manner the water, forced down through the pipe A, passing round the channel $b$, communicates to the surrounding water an eddying action or effect, which causes the heavy or suspended matters contained in it to be thrown or drawn within the strong centrifugal action of the current within the channel $b$, so as to be discharged with it up through the outlet-pipe C.

Figures 30, 31, 32:
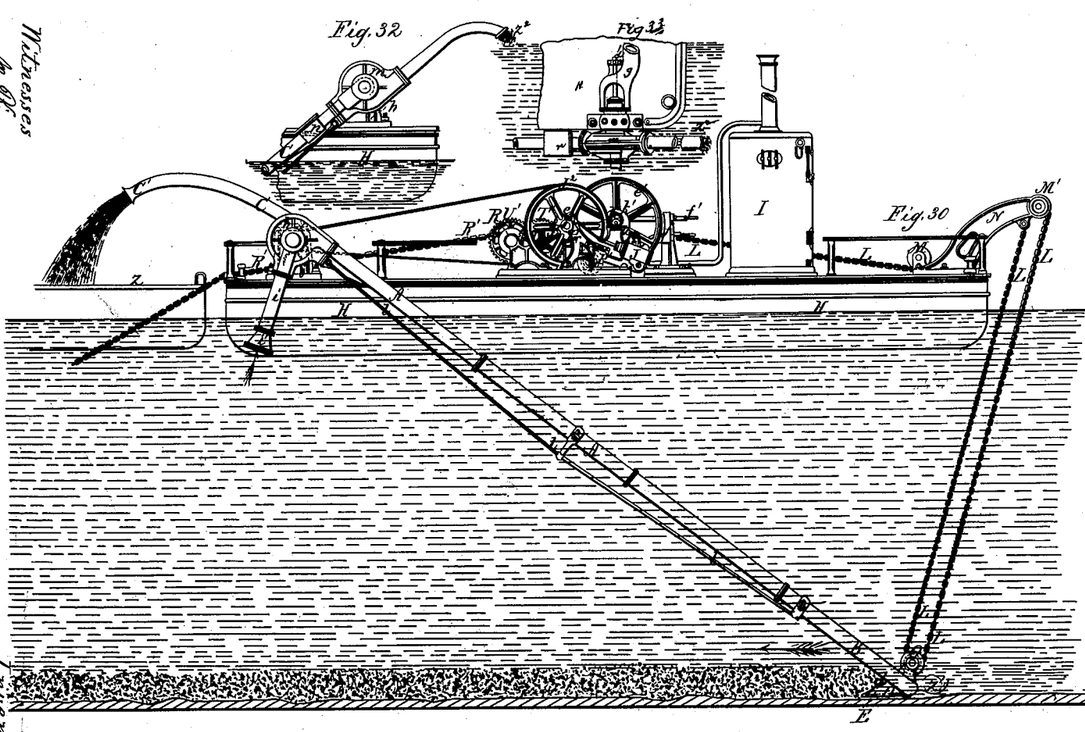
Figure 30, on sheet 2 of my drawings, is a side elevation.
Figure 31, on sheet 3, is a plan of a dredger or dredger-boat, constructed to raise sand, mud, shingle, and other matters, such as usually forms the beds of rivers and docks, by a current of water impelled at high velocities or speeds. The form of the mouth-piece B applied to this dredge is that described in relation to figs. 3, 4, and 5, on sheet 1 of my drawings.
Figure 32 is a side elevation.

The hull H is constructed to give sufficient space and buoyancy for the machinery to be carried high, and, being light compared with that required for an ordinary bucket-ladder dredger-boat, requires a comparatively small hull, which is constructed of iron, much in the ordinary way. The machinery, however, is, by preference, all placed on deck, and consists of an ordinary vertical steam-boiler, I, and mountings, placed near the centre of the dredger, which supplies the engine with steam. The engine J is also of an ordinary construction, but having its framing so constructed as to support the windlass-gearing or mechanism for feeding or drawing forward the dredger and wedged mouth-piece B against the materials, indicated at F to be raised or dredged, and also for carrying the gearing for raising and lowering the mouth-piece and its conducting-pipes.

The engine-crank shaft $J^1$ has keyed on it the wedge and grooved frictional pinion $e$, gearing into the corresponding friction-wheel $e^1$ keyed on the spindle K of the winding-barrel $K^1$. A brake-block, $f$, is placed opposite the wheel $e^1$, upon which the wheel $e^1$ is pressed while the chain-barrel $K^1$ is in the act of lowering through or by the barrel-spindle K, which is carried in an eccentric-bush in one of the side standards, worked or turned round by the hand-lever $f^1$, the whole forming what is known as one of my frictional gearing-hoists.

The lifting-chain L, applied to the barrel $K^1$, is passed under and over the pulleys M and $M^1$ respectively, carried in the strong supporting-bracket N, and is extended downwards and passed round the pulley O fixed to the central part of the mouth-piece B, and finally carried upwards and fixed by a shackle to the bracket N, the whole thereby forming a convenient lifting and lowering-gear for the mouth-piece B and conducting-pipes A C.

A belt-cone, P, keyed on the crank-shaft J¹ gives motion to a corresponding cone-pulley P¹, keyed on the shaft Q by means of a short belt, having my eccentric means of tightening a short belt placed in the cone P¹, and the shaft Q communicates a slow motion to the windlass-barrel R through the train of wheels S S¹, T T¹, and U U¹.

The belt-cones P P¹ to the barrel R, and the frictional wheels S S¹, and eccentric-motion hand-lever V, furnish a most convenient means of throwing the barrel and toothed wheels out of action or gear for lowering or slacking out the chain R¹, which is wound several times round the winding-barrel R, to give it a firm frictional hold, and the extreme end of the chain R¹ is extended out and fixed to an anchor a considerable distance in front of the bows of the dredger, in the usual manner, and a well or receiver is formed in the hull H at W, below the winding-barrel R, for taking in and stowing away the surplus or over-wound chain, the whole of this windlass arrangement forming a convenient feed-motion for drawing forward the dredger H and the mouth-piece B.

A turned fly-wheel, J², is keyed on the engine-crank shaft J¹, over which a belt is passed, and carried forward and passed also over the pulley X keyed on the spindle X¹ of the impeller of the rotary pump h. Although, in this way, a very compact and convenient arrangement of winding and drawing gearing is obtained, still it will be obvious that many other good driving and winding arrangements may be adopted, such as are now in use for similar purposes, varied to suit circumstances, and the essential and new features of this first part of my invention, as applied to dredging.

A strong cast-iron axle or cross-piece, g, extends across the hull H of the vessel or dredger, having a flange formed at one end, to which the exhaust or outlet pipe C, leading up from the mouth-piece B, is bolted by a corresponding "blind" flange formed on the one side of the pipe C. The other end of the cross-piece g, which is forked, is bolted by a stuffing-box flange formed on the inner end of the long neck h' of the rotary pump h. This long neck, h', being turned, forms a bearing-journal, which works in the bush-bearing block or bracket j placed at one side of the hull H, while a turned journal is formed at the opposite end or neck g' of the cross-piece g, which works in a corresponding bushed bracket j¹ placed on the other side of the deck of the hull H. The exhaust-pipe C being thus firmly secured to the cross-piece g at one side or end, and the rotary pump h at the other, and the pump h bolted by flanges at its eduction tangential conduit to the forcing-pipe A, and the two pipes A and C being firmly secured at their lower ends to the ends of the segmental mouth-piece B, and further stayed by the malleable-iron tie-rods l l, the whole forms one strong structure, oscillating on the bearings of the standards j and j¹, when raised and lowered by the chain L and winding-barrel K¹, and capable of withstanding the necessary strain of the direct and traversing action of the mouth-piece B against the earth and substances to be dredged, as indicated at F.

The pump-spindle X¹ is mounted in bearings formed in the cross-piece g, coinciding with the axial line of the journals j j¹, so that the raising and lowering of the conducting-pipes A and C and mouth-piece B does not alter the position of the pulley X, so as to tighten or slacken the belt leading from the fly-wheel J² of the engine J for driving the impeller of the rotary pump h, and a clutch and clutch-handle, Y and Y¹, are fitted close to the pulley X for disengaging it, when the pump h is not required to work, or when the windlass-barrels K¹ and R are required to be worked without the rotary pump h. The rotary pump h has bolted to its suction-orifice, leading to its eye or centre, the suction-pipe i, being so placed that the rose i' is always immersed in the water, while the mouth-piece and conducting-pipe to which it is attached are raised or lowered to various heights.

A portion of the forced current of water from the main forcing-pipe A is conducted by a small eduction bent branch-pipe, k, and cross-pipe, k¹, to an induction curved branch-pipe, K², led tangentially into the main outlet-pipe C, of the mouth-piece B, so as by its injective force on the rising column of water and material being raised in the pipe C, induces a lifting or exhausting effect or action upon it, and so assists the direct force of the main current of water passing from the pump h round the open U-shaped channel of the mouth-piece B, and the pipe k¹ is furnished with a cock, k³, for regulating or putting off or on this injected or inducted current into the pipe C.

Thus arranged, and the mouth-piece B lowered down to the requisite depth in the materials or shingle F to be raised or dredged, and the forward feeding-motion of the dredger and mouth-piece set in action by the hand-lever V of the windlass-mechanism and winding-barrel R, and the pump h put in motion by the clutch-lever Y¹, the water is drawn up through the suction or inlet-pipe i by the pump h, which impels the water down the pipe A with great force, and round the curved open channel b of the mouth-piece B of a slightly-different construction to any of those shown detached on sheet 1 of my drawings, and which difference will hereinafter be described.

Where the mud, shingle, or other material F to be raised is pressed through the grating d into the mouth D, leading to the channel b by the forward feed-motion of the mouth-piece B in the direction of the red-lined arrows, so as to be caught by or drawn into and suspended by the strong current of water passing round the channel b, and forced into and up through the close exhaust or discharge-pipe C to the top open mouth at C¹, where it is discharged into a punt, Z, or other vessel provided for its reception, the course of the current of water, and materials being dredged along with it, is indicated by the black-lined arrows.

The mouth-piece B of this dredger is formed with a deep wedge-shaped grubber, E, having its upper surface ascending at an angle tangentially to the top of the channel b, formed with a grating, d, over the mouth D, leading to the open part of the channel b, and into which the shingle or substances to be dredged are pressed, and led by the forward motion of the mouth-piece, which also forces all larger objects, such as stones, which cannot pass through the grating d, over the top of the channel b into the open cup-shaped or hollow fender Z¹, formed or cast on the back of the mouth-piece B, to receive or trap them, and from which they are removed, when lifted above the water, along with the mouth-piece, by the chain L and winding or windlass-barrel K¹.

Figures 33, 34, 35:
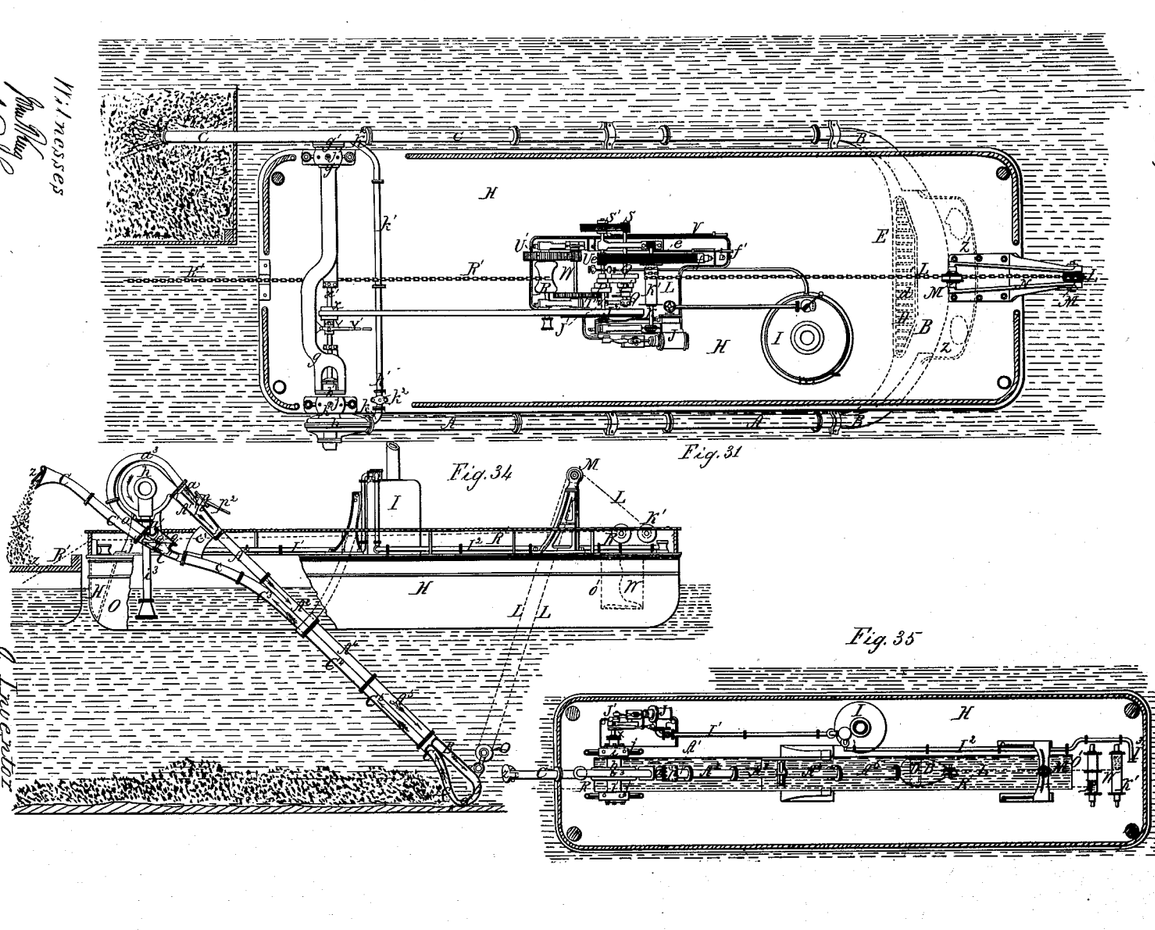
Figure 33 is a plan, both on sheet 2 of my drawings, of a portion of the cross-piece $g$, shown in Figure 37, nearest the exhaust or discharge-pipe C, which is shown as fitted with a suction rotary pump, $m$, to assist in exhausting or drawing up the current of water, and matters being dredged or raised along with it, in the discharge-pipe C by the action of and in connection with forced currents descending the pipe A from the pump $h$, or it may be other forcing-mechanism, or as a substitute for the induced suction-currents caused in the pipe C by the injection of direct jets of forced water, as described, passing through the pipes $k$ $k^1$ $k^2$, in figs. 30 and 31; or in place of using forced currents of water only, as described in relation to these figures, and which arrangement might be judiciously applied to the dredger-arrangements therein shown, where light material, such as sand or mud, is to be dredged, and this arrangement of using both forced and drawn currents of water in the descending and ascending pipes for dredging and reclaiming or raising small objects from under water may be used with any of the mouth-pieces, and for any of the purposes described in reference to figs. 1 to 29 inclusive on sheet 1 of my drawing, or for obvious modifications or adaptations of the same for the like purposes, hereinbefore stated under the first head or part of my said invention, of which this forcing and drawing the currents of water at the same time forms an important new part or feature.
Figure 34 is a sectional side elevation.
Figure 35 is a plan of a dredger-boat, also adapted to dredge by currents of water forced or propelled at high speeds.

When this suction rotary pump $m$ is used in connection with the pump $h$, it may be driven by the same connecting-spindle X¹, and it is preferred to have a check-valve, $n$, fitted to the pipe C, close to the pump $m$, so as to retain the water in the pump. In this arrangement, the dredged sand or mud is passed through the pump $m$, and discharged through the open mouth at Z² from the discharge-pipe leading from the pump $m$.

The mouth-piece B in this arrangement is nearly the same as that shown and described in connection with figs. 19 and 20 on sheet 1 of my drawings.

The hull H is constructed of iron in the usual manner, but the weight of the dredging-apparatus, and the machinery for actuating it and the windlass, being light, is not required to be nearly so deep or to draw so much water as other dredgers now in use, or even as the modification shown in figs. 30 and 31. A long narrow well is formed right up through the centre of the hull H, of sufficient width to admit of the mouth-piece B passing up through, out, and of sufficient length to allow of the raising and lowering of the pipes A and C down through it, and extending from "bulk-heads" $o$ and $o'$ at the forward or after part or ends of the hull respectively.

The machinery is all fixed on deck. A vertical steam-boiler, I, is placed near the centre of the deck, of sufficient capacity to supply steam to both the engines for driving the pump and windlasses. A small engine is used for driving the pump by itself, as also another for driving the windlasses, and as the work to be done by the windlasses is in every respect similar to that described in reference to figs. 30 and 31, I have not shown them in detail in this modification, but only indicated their position and arrangement in relation to new parts or features of this modification of my improvements sufficient to make their action understood in relation thereto.

The pipes A C and mouth-piece B are raised and lowered by the winding-barrel K¹ and chain L, and the traversing feed-motion of the dredger H and mouth-piece B is obtained through from the windlass-barrel R and chain R¹.

A centrifugal pump, $h$, formed with a long hollow projection, $i$ and $i'$, at each side of the centre of the case, is turned so as to work in bush-bearings formed at the top of the strong frames or standards $j$ and $j^1$ secured to and standing up from the deck on each side of the well near the "bulk-head" $o$. As the centres of the hollow journals $i$ and $i'$ coincide with the axis of the spindle X¹ of the pump-impeller, the pump and all its pipes and attachments for conducting the currents, can turn or oscillate on its journal $i$ and $i'$ in the bush-bearings of the standards J and J¹, without changing or affecting the position or action of the pump-impeller or its spindle X¹. On the extreme end of the pump-impeller spindle X¹, a crank, J¹, is keyed, to which is coupled the connecting-rod of the steam-engine cylinder J, which, together with the sole-plate and side-frame J², forms the engine for driving the pump. The steam is conveyed to the cylinder J from the boiler I by the steam-pipe I¹, and a pipe, I², conveys steam to the engine of the windlass at I³. The water is drawn into the pump $h$ through its induction-branch $i$, through the supply-pipe $i'$ furnished with a rose-end and inlet foot-valve at its lower end from the well below, into which it descends; and the branch and pipe $i^3$ are placed a little to one side of the pump, so as to allow of the discharge-pipe C passing in a straight line below the centre of the pump $h$.

The first length of the forcing-pipe A¹, bolted to the flange of the discharge-conduit of the pump $h$, has cast on it a slanting inducting-pipe, $a$, cast with a valve-chest, $p$, having a flanged jointed cover, and fitted with a hinged valve, $p^1$, capable of being opened and shut at pleasure by the hand-lever $p^2$, outside the pipe.

The forcing-pipe A is continued through the five lengths A¹ A² A³ A⁴ A⁵, coupled to the mouth-piece B, the three lengths nearest which are each, by preference, cast in one piece with the corresponding lengths of the exhaust or discharge-pipe C, as also shown in the large detached view of the corresponding mouth-piece, figs. 23 and 24 on sheet 1.

A short length of the exhaust-pipe C¹, placed below the pump $h$, has formed in it a branch-pipe, $a^1$, and chest fitted with a flanged joint attached by screw-bolts. On the inside of the chest $q$, or cover, is cast a series of prongs or guards, $q^1$, projecting downwards, and forming a grating to prevent any large objects from being drawn into the pipe $a^1$.

The next length of this induced water-pipe, $a^2$, is cast in one piece with the corresponding length, C², of the discharge-pipe, and the bent length of the induced water-pipe, $a^3$, connects the latter to the branch $a$ of the chest $p$ and forcing-pipe $A^1$. At the outlet-end or mouth of the discharge-pipe C there is a hinged valve, $z$, which opens outwards, according to the quantity of dredged materials being delivered, and falls down close when there is no water or dredged materials pressing it open.

The pump and pipes, thus secured and bolted to the mouth-piece, and further secured by the cross-tie piece $c^1$, form a strong, rigid structure, are made to oscillate on the hollow-neck journals $i$ and $i^1$, as the mouth-piece B is raised or lowered.

The mouth-piece B being let down into the material to be dredged, by the barrel $K'$ and chain L, as shown in this position, in fig. 34, and the engine J and pump $h$ started, and the feed-traverse of the windlass R put into operation, so as to feed forward the mouth-piece in the direction of the red-lined arrow, the action of the dredger would be as follows, and the course or direction of the currents in the pipe would be as indicated by the black-lined arrows:

The water is drawn up by the impeller into the pumps $h$, through the suction or supply-pipe $i^2$, from the well, and forced out from it, down through the forcing-pipe A, round and through the mouth-piece B, across the open mouth, so as to raise, suspend, and force forward a portion of the mud or other materials F, upon which the mouth-piece B is being traversed, into and up through the exhaust or discharge-pipe C, the upward current in the exhaust-pipe C being assisted by the partial vacuum in it at $q$, by the forced stream from the pump $h$ down the pipe A, which opens the valve $p^1$, and draws a portion of the water from the discharge or exhaust-pipe C, at the chest $q$, through the curved pipe $a^1$, which materially assists the rising of the water and separation of materials being dredged and forced up the discharge-pipe C, further assisted by the gravitating of the heavy matters downwards; and the centrifugal action, induced at the part $C^1$, below the box $q$, where the pipe is curved downwards, and the partial vacuum formed, finally discharges them through the valve $z$. at the upper end of the discharge-pipe C, into the punt Z, or other vessel provided to receive them.

In this way a portion of the ascending water is diverted back to the mouth-piece B, to lift a fresh load or portion of the materials being dredged, and merely the heavy materials discharged, and a consequent saving of power is effected by this arrangement over that described in reference to figs. 30 and 31.

Figures 36, 37, 38:
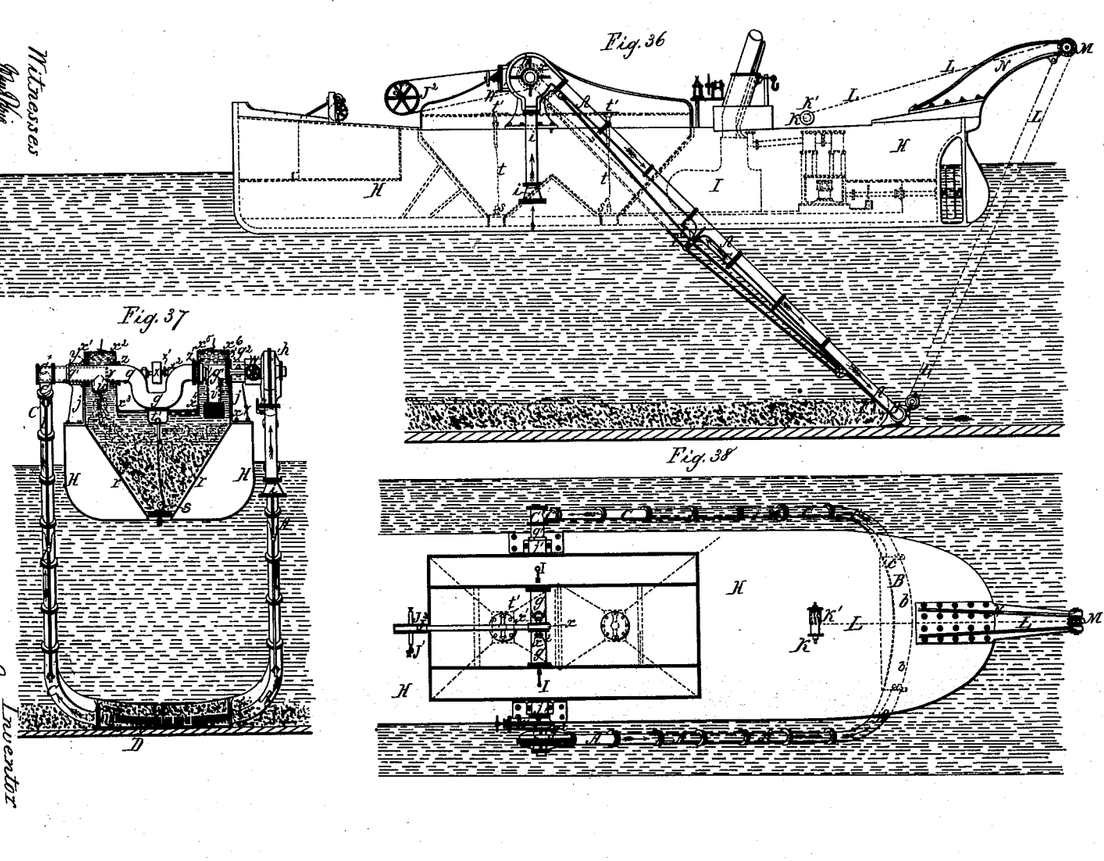
Figure 36 is a side elevation.
Figure 37 is a transverse section.
Figure 38 is a partial plan, all on sheet 4 of my drawings, of another form of a dredge-boat, constructed in accordance with and embodying one modification and arrangement of my invention, as applied to dredging, under the first head or part of my invention.
Figures 39, 40, 41, 42:
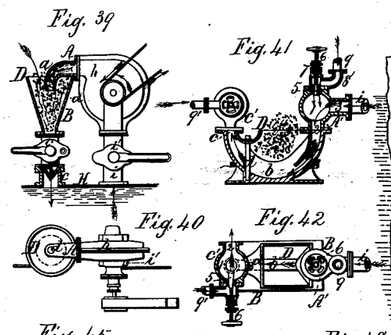
Figure 39 is a side elevation partially in section.
Figure 40 is a plan, on sheet 5 of my drawings, of a centrifugal pump, $h$, and a mouth-piece, B, the mouth-piece being similar to that described in connection, and figs. 11, 12, and 18, on sheet 1 of my drawing, this arrangement and its connections being chiefly designed to form a compact apparatus for the discharge of ashes, grit, or ballast-materials from ships. The outlet-pipe $o$, and supply or inlet-pipe $i$, are here shown as fixed to a plate, H, representing the bottom "skin" plate of a ship, and having the cock $i'$ placed between the pump and the water on the inlet side, and the cock $e$ on the outlet side, and further secured from inward leakage on the exhaust side, when the apparatus is not being used, by the India-rubber valve $c'$. On motion being given to the impeller of the rotary pump $h$, and the cocks $i'$ and $c$ opened, a stream of water will be sent down through the mouth-piece B and valve $c'$ into the water underneath the vessel, and on any material sufficiently small to pass down through the pipe C, being thrown in at the mouth D, it will be carried down and discharged along with the current into the open water beneath, the course of the steam being as indicated by the arrows.
Figure 41 is a sectional side elevation.
Figure 42 is a plan of a mouth-piece, B, and the steam-forcing and exhausting apparatus connected to its forcing and exhausting-pipes A and C, the mouth-piece B itself being entirely similar to that described in connection with figs. 14, 15, and 16, on sheet 1 of my drawings. At A', I place a hollow spherical vessel, 1, having a branch-pipe, 2, connected to jet-pipe $a$ of the mouth-piece B, and another branch-pipe, 3, connected to the water-suction pipe $i$. On the top or opposite side of the vessel 1 to that of the branch-pipe 2, is fitted the brass conical valve-seat or chest 4, the conical stopper 5 of which opening inwards, with the screw-spindle 6, and hand-wheel, the stuffer of the stuffing-box 7 acting as both nut for the screw-spindle, and stuffer for keeping it steam-tight. The seat of the valve 4 or conical stopper, is bored out correspondingly to the stopper or regulator 5, and the flanged branch 8, formed for leading in steam into the chest 4 surrounding the valve or regulator 5. Thus formed, it is secured and jointed to the spherical vessel 1, and a steam-pipe, 9, coupled to the branch-pipe 8. A similar-constructed vessel is also connected at C' to the exhaust-passage $c$, but having the brass valve-chest 4, valve-spindle 6, and outlet-branch 2, disposed horizontally in place of vertically, as over the inlet-passage $a$ at A', just described, and having also a steam-pipe, $g$, coupled to its valve-inlet, the same as on the valve-chest. On the conical stoppers 5, of the valve at A' and C', being opened, the steam rushes through and forms a partial vacuum in the vessel 1, causing the water to flow in through the branch 3 coupled to the water-supply or exhaust-pipe *i*, and forces it out at the branch 2, opposite the steam-jet, in a continuous stream, through the spherical chest 1, and its ejecting-apparatus at A' throwing or forcing the water into the mouth-piece B, and the vessel at C' and its ejecting-apparatus exhausting out the water (and ashes or other material thrown by hand into the open mouth D) from the mouth-piece B, and discharging or forcing it or them out at the branch-pipe 2 at C'. In this way the water is made to enter in at the pipe D, flow through the mouth-pieces B, and be discharged by the branch-pipe C', which branch-pipe may be connected by any convenient length of pipes, so as to convey the water and materials to where it is desired. This mouth-piece may also be used with only one set of ejecting or forcing-apparatus placed in the forcing side A', as also with one set only on the exhausting side C', if provision is made for the water to flow into the mouth-piece B.
Figure 43:
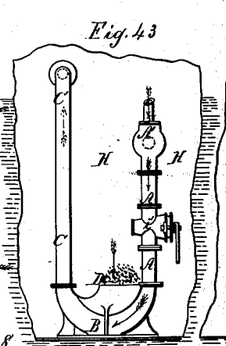
Figure 43 is a side elevation.
Figure 44:
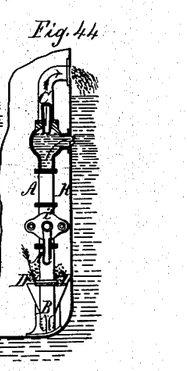
Figure 44 is an end elevation, partially in section, of a modification of the apparatus just described in reference to figs. 41 and 42, for throwing ballast, ashes, or grit out of ships, and the inlet branch-pipe *i*, and the outlet-pipe C being shown jointed to the "skin"-plate H of the vessel, the mouth-piece B being also the same as that described in connection with figs. 14, 15, and 16. In this example, a forcing spherical chamber, A', only is shown applied, and a steam-jet pipe, 5, the steam-regulator described in connection with figs. 41 and 42 not necessarily requiring to be of the same construction, or fixed to the forcing-chamber A', are not shown in this case. The forcing-pipe A has fixed in it a stop-cock, *i'*, and on its being opened and steam admitted through the jet-pipe 5, the water is drawn into the spherical vessel A' through the skin-plate H, and forced down through the pipe A and mouth-piece B, and up through the exhaust-pipe C, and on any material sufficiently small being put in at the opening D of the mouth-piece B, it will be discharged from the exhaust-pipe C, the course of the current being as indicated by the arrows shown on the pipes. It is also intended to use this apparatus for the same purposes with a forcing spherical channel or other form of steam-ejecting or forcing-apparatus connected to the exhaust-pipe C only, and allow the water to flow into the mouth-piece B through the pipe A, by the overhead pressure of the water from the outside of the vessel.

In this construction or arrangement, the dredge-boat is designed to serve the double purpose of raising up the materials to be dredged, and of carrying it away and depositing it out in deep water, the form of the hopper-shaped "hould" for receiving the dredged matter propelling-machinery, all being similar to what is at present known as a "steam-hopper barge," a description of vessel used as an adjunct to ordinary dredges for carrying out and depositing, through trap-doors, the dredged matter in deep water out of the way.

Dredgers have also been constructed of other forms, for the purposes both of raising and transporting dredged matter, and therefore I only improve upon these by combining my new and improved dredging-apparatus with this construction of vessel.

The dredger represented in this modification is calculated to carry about three hundred tons of dredged matter, and this, together with the boilers and engines, of about forty nominal horse-power, together with the screw-propeller and connections, necessitates considerable carrying-capacity.

The hull H is of the ordinary form, as described, and the mouth-piece B is of the same form as that described in connection with figs. 3, 4, and 5 on sheet 1 of my drawings; but in this case, on account of its size, it is cast in three pieces, and jointed together; otherwise, however, it is of the same construction.

The lifting and lowering-gear for the mouth-piece is also similar in its action to that described in connection with figs. 30 and 31. The forward feed-motion may either be effected by similar windlass-gear to that explained in connection with figs. 30 and 31, or effected by the screw-propeller worked at a slow motion, which in soft mud would be manageable, and save the trouble of securing the feed-chain to an anchor "forward of the bows" of the vessel.

$r$ is the hopper-shaped "hould" for receiving the dredged matter, having the trap-doors $s\ s'$ and trap-chains $t$, for depositing the dredged materials, all very much of the ordinary construction.

A strong hollow cross-piece, $g$, is seen in figs. 37 and 38, having turned necks at $g\ g^1$, which are placed in the bush-brackets $j\ j'$, and these secured at their respective sides of the vessel by bolts to the deck. Thus placed, the cross-piece is free to oscillate in its bearings in the same way as that described in connection with figs. 30 and 31.

The suction or exhaust-pipe C leads into the chest-piece $C^\times$, formed or attached on its upper end, where it is bolted by side flanges to the overhanging end of the cross-piece at $g^1$, so that this chest-piece is open from the exhaust-pipe C into the open or hollow end $g^1$ of the cross-piece $g$, up to the cross-end or vane $u$, at which part an open branch, $u'$, projecting downwards, provides an unobstructed passage for the ascending water and dredged matter to fall or be delivered into the hopper-shaped "hould" $r$.

The outer end $g^2$ of the cross-piece $g$ has bolted to it, by a large flange, the sluice-valve $w$, fixed and opening into the centrifugal pumps $h$. The central induction-eye or port of the cross-piece $g$, at the end $g^1$, from the sluice-valve $w$ up to the cross-end or vane $v$, is cast hollow at this part, where the branch $v'$ is made to descend downwards, and fitted at its lower end with a rose or grating.

When the valve $w$ is open, a free passage is formed from the exhaust or suction-passages of the pump $h$ to the hopper-receiver $r$.

A closed air-tight case, $x, x^1, x^2, x^3, x^4, x^5, x^6$, and $x^7$, (fig. 37,) of boiler-plate, wholly covers in the mouth or top of the hopper $r$, and the portions $g^1$ and $g^2$ of the cross-piece $g$, and where the casing $x$ comes over the cross-piece $g$, stuffing-boxes and stuffers, $y$ $z$ and $y'$ $z'$, are fitted to the corresponding parts, $g^1$ and $g^2$, of the cross-piece $g$, which, being turned, the case is thereby made air-tight.

To the pump $h$ is attached the forcing-pipe A, which is extended down and connected to the mouth-piece B. This arrangement, as also that of the suction-pipe $i$, connected to the induction-port of the pump $h$, being all the same as that described in reference to figs. 30 and 31 on sheets 2 and 3, need not be here further described.

A throttle-valve, $i'$, is fitted in the supply suction-pipe $i$, for closing or partially closing the supply of water to the pump through this pipe, as, when the dredger is in action, a very limited quantity of water only through this pipe is required to make up for loss at the mouth-piece.

Two escape-valves, 1 1, are fitted at the top of the casing, opening outwards, for taking off the air from the hopper $r$ and its casings $x$, and two man-hole doors, $t'$, are formed in the casing $x$, above the hopper-trap $s$ $s'$, for access to the trap-chains $t$, the eyes of the trap-chains $t$ being held up by bows stretched across the man-hole doors $t'$, for easy access and convenience in lifting the trap-doors $s$ $s'$.

The pump-spindle $x^1$ is set in bearings on the cross-piece $g$, having a stuffing-box at $x^2$. Its centre coincides with the axis of the journals $g^1$ and $g^2$ of the cross-piece $g$, retains the same position in whatever posture the mouth-piece B is held, as explained in connection with the corresponding parts in figs. 30 and 31.

A belt-pulley, $x$, is keyed on the pump-spindle $x^1$, and a belt is passed over it and the fly-wheel $j^2$ of its separate driving steam-engine, the crank-shaft of which is only shown in figs. 36 and 38, to show its position.

On setting this form of my dredging-apparatus in action, the mouth-piece B being placed the requisite depth in the materials, F, to be lifted, and the forward feed-motion being given to the dredger, and circular motion given to the centrifugal pump $h$, the throttle-valve $i'$ is kept full open, and the sluice-valve $w$ closed, so as to force the water down the pipe A and up the suction-pipe C, until the hopper $r$ is filled up to the top of the casing, where the air escapes from the hopper by the valves 1 1, until the hopper is entirely filled with water, fig. 37. (It may also, in part, be filled by a separate pipe passed through the "skin" of the vessel.) The valve $w$ is then opened, and the throttle-valve $i'$ in the pipe $i$ partially or wholly closed.

The water is then drawn from the hopper $r$, up through the branch-pipe $v'$ and opening $g^2$ of the hollow cross-piece $g^1$, and through the valve-chest $w$, into the pump $h$, which also forces it down through the forcing-pipe A, and down through the mouth-piece B, thus forcing and lifting the same water, with a constant supply of fresh materials, F, pressed into and suspended in it at the mouth-piece, up the pipe C, and depositing the heavy matter in the hopper $r$.

As the hopper $r$ is air-tight, an effective vacuum is formed in it as the water is drawn off by the centrifugal pump $h$, and as the motion of the water between the openings $u'$ and $v'$ of the cross-piece inside the hopper is slow, the heavy matter brought up the ascending current readily settles down or subsides until the hopper is filled, and little of the matter is taken back with the descending water drawn through the rose or grating of the branch-pipe $v'$.

By this modification of my dredging-apparatus the loss of power, by the escape of water along with the dredged matter at the top of the discharge-pipe C of the former modifications shown on sheets 2 and 3 of my drawings, is saved, and very little loss of power is sustained beyond the friction of the water in the pipes.

Figures 45, 46, 47, 48, 49, 50, 51, 52, 53, 54:
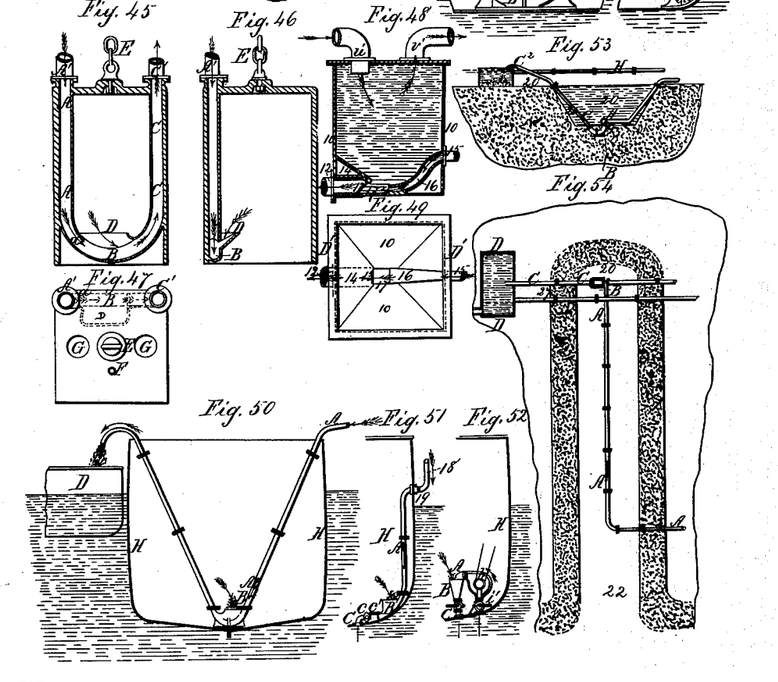
Figure 45 is a vertical section.
Figure 46 is a transverse vertical section, at right angles to fig. 45.
Figure 47 is a plan of a diving-bell for raising materials from under water, having the forcing-channel A, the mouth-piece B, and the exhausting-channel C, cast in one piece with the bell, the form of the mouth-piece B being similar to that described in connection with figs. 14, 15, and 16, on sheet 1 of my drawings. The diving-bell itself is otherwise of the ordinary construction, having a lifting-shackle and chain, E, as attached, and the pipe-socket F for coupling on the hose-pipe, for the air being forced in for the respiration of the workman, and also the two panes of glass, G, for admitting light into the bell, as indicated in fig. 47. The forcing branch-pipe A', and the exhausting branch-pipe C', are adapted for fixing the hose-pipe to, thus arranged, and the water being made to flow through the forcing-pipe A' A, and mouth-piece B, and up through the exhausting-pipe C, a continuous stream is thereby made to pass through the bell, and form a convenient conveyance for any material small enough in size to pass up through the pipe C to the diving-bell barge; the workman entering in the materials at the opening D of the mouth-piece B, the course of current being as indicated by the arrows.
Figure 48 is a sectional elevation.
Figure 49 is a plan of a trap-box for trapping the materials exhausted from any of the forms of mouth-pieces, is a modification shown on sheet 1 of my drawings, designed to retain as much of the materials suspended or carried up by the water-current as possible, and for diverting the water thus raised, back to the mouth-piece or its forcing-apparatus. 10 is a box fitted with a cover, and closed in and jointed up water-tight, fig 49 being shown with the cover off to show the form of the bottom, which is hopper-shaped. *u'* is an exhausting-pipe led from a mouth-piece, and *v'* is a pipe leading back to the forcing side or forcing-apparatus connected with a mouth-piece. At the side, and close to the bottom of the box, is a pipe, 12, which is inserted into the box, having the hinged valve 13 fitted on its inner end, and opening outwards, the pipe being covered in on the top by the slanting piece or side of the hopper 14. On the opposite side of the box 10 a branch-pipe, 15, is coupled to the jet-channel 16 cast in the bottom of the box, and carried downwards until its orifice, 17, is opposite to the hinged valve 13. On the hinged valve 13 being closed, and water and materials, such as sand and shingle, being thrown into the box 10, it subsides, as indicated in the drawing, the water rising up and flowing off through the outlet-pipe *v'*, freed from most of the materials lifted or forced from a mouth-piece, B, through the pipe *u'*, caused by the reduced speed of the current in the box 10. On the box 10 becoming filled with the subsided matter, the hinged valve 13 is opened, and a jet of water or steam forced in through the jet 15, pipe 16, and jet-channel 17, which, together with the pressure on the top of the subsided materials exerted by the water, forces out the contents of the box quickly through the pipe 12, and which, when emptied, is again closed, and the box is then in a state to be refilled. This contrivance saves the drawback of having to use trap-doors in the trapping-apparatus, which in many positions is inconvenient.
Figure 50 is a cross-section of the hull of a ship, and elevation of a mouth-piece and pipes, and portion of a lighter or barge, showing a method of using this apparatus in a portable form for the discharge of ballast from ships. A forcing-pipe, A, is led over the side of the vessel down to a mouth-piece, B, placed in the bottom of the "hould," having the exhaust or discharge-pipe C led up over the opposite side of the ship so as to discharge the ballast thrown into the mouth-piece B along with the strong current of water forced through the pipe A, box B, and discharge-pipe C, as indicated by the arrows, into the lighter or barge. The form of the mouth-piece B, shown applied in this arrangement, is that described in connection with figs. 14, 15, and 16, on sheet 1.
Figure 51 is a part of the cross-section of a ship, and elevation of a mouth-piece and pipe for discharging ballast, ashes, or other materials through the bottom of the ship, the forcing-pipe A and mouth-piece B being in this example fixed in the vessel. The mouth-piece B, shown applied, is somewhat similar to that described in reference to figs. 8, 9, and 10, on sheet 1 of my drawings, but slightly modified, the outlet-pipe C being fitted with a valve, c', and stop-cock c, for securing the vessel against inward leakage when the apparatus is not being used, somewhat similar to that shown in connection with figs. 39 and 40. A hose-pipe, 18, joined to the pipe A by the coupling 19, conveys the forced water from any convenient forcing-apparatus on the harbor, and discharges the water and materials raised into a barge or a hopper-barge for carrying the dredged matter lifted; also carry the forcing-apparatus adapted for this purpose, and to be coupled on in this way by the flexible hose, would be a convenient arrangement. Mouth-pieces similarly placed to this in the bottom of vessels, and wrought by a steam-jet in the way described in connection with figs. 41 and 42, would also be a convenient arrangement.
Figure 52 is a cross-section of part of the hull of a ship, with a mouth-piece and pump for the discharge of ballast through the bottom of the ship, the mouth-piece and pump being as described in connection with figs. 39 and 40.
Figure 53 is a sectional end elevation.
Figure 54 is a plan of a mouth-piece and pipes, shown applied for raising and discharging excavated matter from a channel or canal being cut, the material cut by hand, by the spade, or otherwise, as at 20, and thrown into the mouth-piece B, to be carried away up and over the sloping bank 21 by the water-current.
Figure 61:
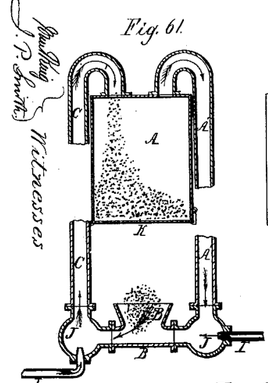
Figure 61 is a side sectional elevation.
Figure 62:
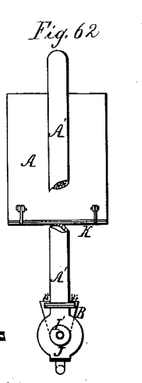
Figure 62 is an end elevation of an apparatus for raising or conveying sand, grit, ashes, and similar light substances, by the combined agency of currents of steam and air, the power and motion being transmitted to the air directly by jets of steam, and passed along the pipes or conduits intermixed with the air, in this example in a returning or endless current. A trap-box, $A^1$, with a forcing-pipe, A, is connected to the spherical inducing-vessel J, the mouth-piece B, the spherical vessel $J^1$, and pipe C, which is also connected to the trap-box $A^1$, the pipes being broken short, as substances can be raised to a great height in this way. On steam being admitted by the jet-steam pipes I and $I^1$, and substances entered at the mouth-piece B, they will be raised and deposited in the trap-box A, the course of the current being as indicated by the arrows, a trap-door, K, being provided for emptying the box $A^1$ when it becomes full.

In starting an operation of this kind, one way of doing it would be to provide a stationary steam-engine and forcing-pumps. Rotary pumps being the least expensive, and having the advantage of giving, in a simple way, a continuous current, are the best known to me. The forcing-pipe, A, leading forward the water to the mouth-piece, should be made as large in diameter as to maintain the current at not more than three feet per second, in order to avoid loss from friction in the pipe. The discharge-pipe ought to be of a diameter to give a speed of about twelve feet per second, to give sufficient force for carrying up matter such as sand and shingle.

The drawings show the apparatus as applied to a dry channel, 20, 21, and 22. A forcing-pipe, A A, coupled to a forcing-apparatus, as described, is led down to the bottom of the channel, to be cut and connected to a mouth-piece, B, the description of mouth-piece shown applied being that described in connection with figs. 14, 15, and 16 of my drawings, in sheet 1, which is shown placed with the mouth or inlet for the material sunk flush with the bed of the channel, so as the jet may carry off any water that may collect in the channel or bed of the canal being cut, as well as the materials thrown into it, and force all up through the exhaust or discharge-pipe C, into a trap-box, D, or out upon the open ground, as might be found convenient. In this way, when such a distance forward of the channel has been cut as becomes inconvenient to convey the materials to the mouth-piece B, it is shifted correspondingly forward, and one or more lengths of forcing-pipe, A, added, to keep the mouth-piece near to the part, 20, being cut. The trap-box D, for the excavated materials is shown open at the top and bottom, and is simply designed to keep the dredged or excavated matter together until it subsides. For conserving the water to be used over again, an arrangement of a portable trap-box, similar to that described in connection with figs. 48 and 49, could be used.

Another simple mode of working this excavating-apparatus for this purpose is to have a portable engine and pumps, and have the forcing-pipe A led down to the mouth-piece B, and a return or exhaust-pipe, H, led back from the trap-box D, thus using the water over and over again.

Figure 67 is a side sectional elevation, and

Figure 71 is a side elevation, and

Figures 63, 64, 73:
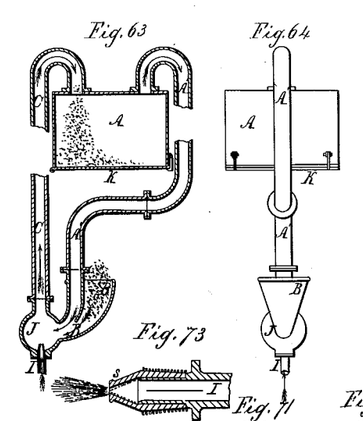
Figure 63 is a side sectional elevation.
Figure 64 is an end elevation of a similar apparatus to that just described, having a trap-box, A, and a mouth-piece, B, and spherical inducing-vessel, J, cast in one piece, and connected together by the pipes $A^1$ and C. On steam being admitted by the jet-pipe I, the motion of the current induced is as indicated by the arrows.
Figures 65, 66:
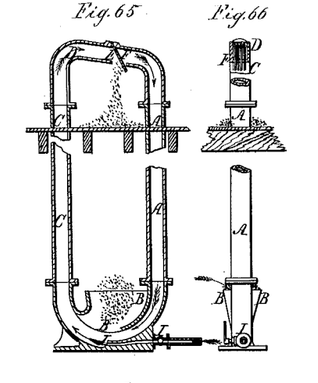
Figure 65 is a side sectional elevation.
Figure 66 an end elevation, partly in section, of an endless or returning-current-elevating apparatus, having the connecting-pipes A and C, joined at the top without a trap-box, and a mouth-piece B, with the steam-jet channel I cast into it. The cross-pipe D has an opening, E, formed into it, and a series of tapering pikes, F, secured in the top side of the casting in a slanting position, these pikes being placed closely together, and used in preference to a grating, from their affording a less entangling surface for the substances coming in contact with it. On steam being admitted through the jet-channel I and pipe, and substances being entered at the mouth-piece B, the current will be as indicated by the arrows, the large particles glancing off the pikes are diverted down through the opening E, and the air and steam or portion thereof passing with considerable force through between the pikes, passes down through the pipe A into the mouth-piece, to assist in raising a fresh load of the material acted upon.
Figure 68:
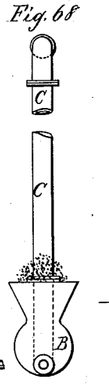
Figure 68 is an end elevation of a mouth-piece, B, and exhaust-pipe C, for raising materials without the returning action, which, on steam being introduced by the jet-pipe I, and material at the mouth-piece B, the current will be as indicated by the arrows, and the materials forced through the pipe C.
Figure 69:
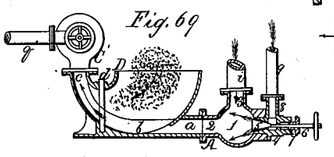
Figure 69 is a side sectional elevation.
Figure 70:
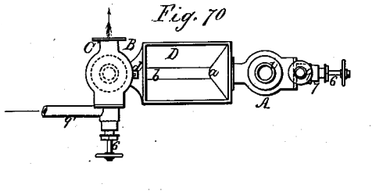
Figure 70 is a plan of a mouth-piece B, with a spherical exhausting-vessel, $C^1$, on the exhaust side pipe $c$, and a similar vessel, $A^1$, and steam-jet valve 5, on the forcing side, to be used for raising materials by steam and air. As this mouth-piece and connections are similar to that described in connection with figs. 41 and 42, to be used for lifting by water, on sheet 5 of my drawings, it will be understood by referring to it.
Figure 72:
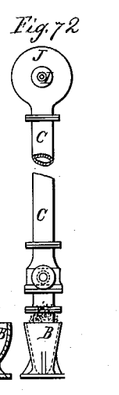
Figure 72 is an end elevation of an exhausting steam-jet vessel connected to a mouth-piece, B, by the exhaust-pipe C, steam being admitted by the jet-pipe I. The direction of the current produced is as indicated by the arrows. The steam-jet pipe I of this inducing-vessel, J, has fitted on its mouth a thick ferrule or short taper tube of India rubber, S, better seen in connection with the enlarged drawing of it, Figure 73.

The jet-pipe provided with this description of jet-opening enlarges with the increased supply of steam, and contracts correspondingly as the quantity of pressure is diminished, until it becomes closed or nearly so, and thereby retains the velocity of the issuing jet at or near the velocity that is due to the pressure, whatever the quantity may be. The India-rubber hose-mouth-piece S is shown fixed on with cord, +, wound over it to secure it to the pipe-piece I. This plan of making the jet-pipes adjust themselves to the pressure and quantity of the fluid forced through them is alike serviceable for water as for air and steam. $I^2$ is another steam-jet which can be used concurrently with I, or by itself.

Figures 74, 75:
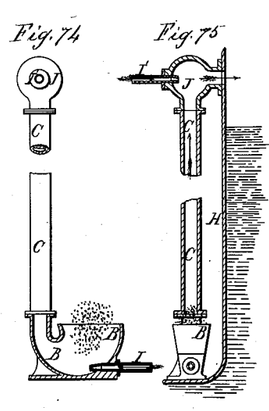
Figure 74 is a side elevation, partly in section.
Figure 75 is an end elevation, partly in section, of a mouth-piece, B, with a steam-jet pipe, I, inserted into it for forcing, and a spherical inducing-vessel, J, having a steam-jet pipe, $I^1$, inserted into it, connected by the pipe C. The apparatus in this form is here shown fixed to the "skin"-plates H of a ship, and is adapted for raising ashes from steamers. The direction of the current is as indicated by the arrows.

Instead of the I or $I^1$, an annular jet may be seen in section at D, the steam being admitted into the annular space $a$, through the branch-pipe $b$, and issuing in an upward direction through the annular opening $c$; combining with and giving motion to the air.

I am aware that air alone in currents has been used as a lifting-medium in certain forms of grain-cleaning machines, and for the transmission of grain from one position to another. I do not propose to use air alone in currents as an excavating-medium. In all the other modifications the currents are produced by the combined action of steam and air, and possess a simplicity for producing the currents for these purposes unattainable by other means.

Having now described the nature of my said invention, and particularized the same in such manner that others will be enabled to carry my improvements into effect, I would here state that I do not confine or restrict myself to the exact details and precise arrangements of all the parts which I have considered it advisable to describe and delineate, as many modifications and variations may be made therefrom, without departing from the leading and essential features of my said invention; and I would also state I do not claim to have invented many of the working and other parts of the machinery or apparatus by themselves.

What I consider is novel and original, and claim as of my invention, is—

1. The mouth-piece B, forcing-pipe $A^1 A^2$, &c., and exhausting-pipe $C^1, C^2$, &c., in combination with a pump for forcing a strong current of water through the apparatus, as and for the purposes herein specified.

2. In combination with the above, the rotating spike-cylinder $E^1$, arranged to operate therewith, as and for the purposes herein specified.

3. The mouth-piece B, with a pump forcing-pipe and exhausting-pipe, substantially as specified, connected to and arranged to operate from the floating structure H, as and for the purposes herein specified.

In testimony whereof, I have hereunto set my name in presence of two subscribing witnesses.

JAMES ROBERTSON.

Witnesses:
JOHN P. KING,
J. P. SMITH.